(12) United States Patent
Fujiwara

(10) Patent No.: US 9,758,122 B2
(45) Date of Patent: Sep. 12, 2017

(54) REAR SEAT SIDE AIRBAG DEVICE

(71) Applicant: Toyota Jidosha Kabushiki Kaisha, Toyota-shi Aichi-ken (JP)

(72) Inventor: Yusuke Fujiwara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/196,837

(22) Filed: Jun. 29, 2016

(65) Prior Publication Data

US 2017/0072894 A1    Mar. 16, 2017

(30) Foreign Application Priority Data

Sep. 11, 2015   (JP) .................................. 2015-179826

(51) Int. Cl.
*B60R 21/231*     (2011.01)
*B60R 21/207*     (2006.01)

(52) U.S. Cl.
CPC .......... *B60R 21/231* (2013.01); *B60R 21/207* (2013.01); *B60R 2021/2078* (2013.01); *B60R 2021/23153* (2013.01)

(58) Field of Classification Search
CPC ................ B60R 21/231; B60R 21/207; B60R 2021/2078; B60R 2021/23153
See application file for complete search history.

(56) References Cited

U.S. PATENT DOCUMENTS

| | | | | |
|---|---|---|---|---|
| 5,799,970 A | * | 9/1998 | Enders .................. | B60R 21/207 280/728.2 |
| 2006/0061073 A1 | | 3/2006 | Naruse et al. | |
| 2007/0224862 A1 | * | 9/2007 | Tyler ................ | H01R 13/62938 439/157 |
| 2009/0134610 A1 | * | 5/2009 | Kai ........................ | B60R 21/207 280/728.3 |
| 2012/0187729 A1 | * | 7/2012 | Fukawatase ......... | B60N 2/4492 297/216.1 |
| 2016/0101758 A1 | * | 4/2016 | Fujiwara ........... | B60R 21/23138 280/729 |
| 2016/0272144 A1 | * | 9/2016 | Futai ..................... | B60R 21/233 |

FOREIGN PATENT DOCUMENTS

| | | | | |
|---|---|---|---|---|
| DE | EP 1153806 A2 | * | 11/2001 | ........... B60R 21/213 |
| JP | 2006-088774 A | | 4/2006 | |
| JP | 2006-088850 A | | 4/2006 | |
| JP | EP 1867528 A1 | * | 12/2007 | ....... B60R 21/23138 |
| JP | 2010-247800 A | | 11/2010 | |

* cited by examiner

*Primary Examiner* — Darlene P Condra
(74) *Attorney, Agent, or Firm* — Dinsmore & Shohl LLP

(57) ABSTRACT

A rear seat side airbag device includes: an airbag module that is placed between a side portion of a seat back of a rear seat and a body, the airbag including a side airbag that deploys at the side of an occupant at a time of a collision and an inflator that supplies a gas to the side airbag; and a case in which the airbag module is stored, the case being equipped with a bottom wall that supports, from a vehicle rear side, the side airbag in a deployed state, the case having a sloping surface that is formed at a lower portion of the bottom wall and slopes in a vehicle forward direction heading in a vehicle downward direction relative to a common portion of the bottom wall.

7 Claims, 10 Drawing Sheets

REAR SEAT SIDE AIRBAG DEVICE

CROSS-REFERENCE TO RELATED APPLICATION

This application claims priority under 35 USC 119 from Japanese Patent Application No. 2015-179826 filed on Sep. 11, 2015, the disclosure of which is incorporated by reference herein.

BACKGROUND

Technical Field

The technology of the present disclosure relates to a rear seat side airbag device.

Related Art

Japanese Patent Application Laid-open (JP-A) No. 2006-088774 discloses a configuration where an airbag module including a side airbag and an inflator is disposed between a side portion of a seat back of a rear seat and a body. Here, the airbag module is housed in a case, and the case is configured to include a bottom wall that supports, from the vehicle rear side, the side airbag in a deployed state.

However, in the configuration disclosed in JP-A No. 2006-088774, the flow of the gas generated from the inflator and heading toward the upper portion and the lower portion of the side airbag is obstructed by the upper surface and the lower surface of the case, so there is room for improvement in order to rapidly deploy the upper portion and the lower portion of the side airbag. In particular, it is desired to rapidly deploy the lower portion of the side airbag so that the pelvic region and the abdominal region of the occupant can be protected even in a case where the rear side door has entered the cabin at the time of a collision such as a side collision.

SUMMARY

An object of an embodiment of the present disclosure provides a rear seat side airbag device that can rapidly deploy the lower portion of a side airbag.

A rear seat side airbag device of a first aspect of the present disclosure includes: an airbag module that is placed between a side portion of a seat back of a rear seat and a body, the airbag including a side airbag that deploys at the side of an occupant at a time of a collision and an inflator that supplies a gas to the side airbag; and a case in which the airbag module is stored, the case being equipped with a bottom wall that supports, from a vehicle rear side, the side airbag in a deployed state, wherein the case has a sloping surface that is formed at a lower portion of the bottom wall and that slopes in a vehicle forward direction heading in a vehicle downward direction relative to a common portion of the bottom wall.

In the first aspect, the rear seat side airbag device is equipped with the case that stores the airbag module. Furthermore, the bottom wall of the case is configured to support, from the vehicle rear side, the side airbag in a deployed state. Because of this, when the gas is supplied from the inflator to the side airbag at the time of a collision, the side airbag bears a reaction force from the bottom wall and becomes deployed in the vehicle forward direction.

Here, the sloping surface is formed at the lower portion of the bottom wall, and the sloping surface slopes in the vehicle forward direction heading in the vehicle downward direction relative to the common portion of the bottom wall. Because of this, the gas generated from the inflator can be made to flow in the vehicle forward direction and the vehicle downward direction along the sloping surface, and the lower portion of the side airbag can be rapidly deployed.

A rear seat side airbag device of a second aspect of the present disclosure is the first aspect, wherein the sloping surface is formed as far as a lower end of the bottom wall.

In the second aspect, the gas generated from the inflator can be made to flow along the sloping surface as far as the lower end of the bottom wall. Thus, the second aspect has the superior effect that, compared to a configuration where the sloping surface is only formed as far as the vehicle upper side of the lower end of the bottom wall, the lower portion of the side airbag can be rapidly deployed.

A rear seat side airbag device of a third aspect of the present disclosure is the first aspect, wherein the sloping surface is formed at a position that is offset to a vehicle upper side of a lower end of the bottom wall, and a region of the bottom wall on a vehicle lower side of the sloping surface is positioned further in the vehicle forward direction than the common portion on the vehicle upper side of the sloping surface.

In the rear seat side airbag device of the third aspect, the lower portion of the bottom wall is positioned further in the vehicle forward direction than the upper portion of the bottom wall across the sloping surface. Because of this, when the gas is supplied from the inflator to the side airbag, the lower portion of the side airbag bears the reaction force more from the vehicle front side than the upper portion of the side airbag, and because of this reaction force, the lower portion of the side airbag can be rapidly deployed. Thus, the third aspect has the superior effect that the lower portion of the side airbag can be rapidly deployed utilizing the difference in the positions of the reaction force surfaces that cause the reaction force to act on the upper portion and the lower portion of the side airbag.

A rear seat side airbag device of a fourth aspect of the present disclosure is the third aspect, wherein the side airbag is turned back in the vehicle forward direction inside the case on the vehicle lower side of the sloping surface.

In the fourth aspect, the lower portion of the side airbag is turned back in the vehicle forward direction inside the case on the vehicle lower side of the sloping surface. Because of this, when the gas is supplied from the inflator, the region turned back in the vehicle forward direction can be rapidly deployed by the deployment pressure. Thus, the fourth aspect has the superior effect that, compared to a configuration where the lower portion of the side airbag is not turned back or a configuration where the lower portion of the side airbag is turned back in the vehicle rearward direction, the lower portion of the side airbag can be rapidly deployed.

A rear seat side airbag device of a fifth aspect of the present disclosure is the first aspect, wherein a lower end portion of the sloping surface is positioned at a vehicle lower side of an upper surface of an arm rest of a rear side door as seen in a vehicle side view.

In the fifth aspect, the gas can be made to flow toward the vehicle lower side of the upper surface of the arm rest to rapidly deploy the lower portion of the side airbag. As a result, even in a case where the space between the door trim and the pelvic region or the abdominal region of the occupant is narrow, the side airbag can be deployed in this space. Thus, the fifth aspect has the superior effect that, even in a configuration where the space between the door trim and the pelvic region or the abdominal region of the occupant is narrow, the ability of the side airbag to protect the occupant can be well maintained.

A rear seat side airbag device of a sixth aspect of the present disclosure is the fifth aspect, wherein the airbag module is placed in a position where at least part of the airbag module overlaps with the arm rest as seen in a vehicle front view.

In the sixth aspect, the ability of the side airbag to protect the occupant can be well maintained even in a case where at least part of the airbag module overlaps with the arm rest as seen in a vehicle front view. That is, if the rear side door enters the cabin at the time of a collision such as a side collision, the deployment of the side airbag becomes obstructed and the side airbag becomes unable to be deployed on the side of the occupant, but by rapidly deploying the lower portion of the side airbag, the occupant can be protected before the rear side door enters the cabin. Thus, the sixth aspect has the superior effect that, even in a configuration where the space between the door trim and the pelvic region or the abdominal region of the occupant is narrow, the ability of the side airbag to protect the occupant can be well maintained.

A rear seat side airbag device of a seventh aspect of the present disclosure is the first aspect, wherein an upper wall, which extends in the vehicle forward direction from the bottom wall as seen in a vehicle side view and forms an obtuse angle with the bottom wall, is disposed on an upper end portion of the case.

In the seventh aspect, the gas generated from the inflator and heading in the vehicle upward direction can be made to flow along the upper wall to the upper portion of the side airbag, and the upper portion of the side airbag can be rapidly deployed. Thus, the seventh aspect has the superior effect that both the upper portion and the lower portion of the side airbag can be rapidly deployed.

BRIEF DESCRIPTION OF THE DRAWINGS

An exemplary embodiment of the present disclosure will be described in detail based on the following figures, wherein.

DETAILED DESCRIPTION

A rear seat side airbag device 10 pertaining to an embodiment will be described with reference to FIGS. 1-5. It should be noted that arrow FR appropriately shown in these drawings indicates a vehicle forward direction, arrow UP indicates a vehicle upward direction, and arrow RH indicates a vehicle rightward direction when facing the traveling direction. Furthermore, when the directions of front and rear, up and down, and right and left are used without further specification in the following description, these will be understood to mean front and rear in the vehicle forward and rearward direction, up and down in the vehicle upward and downward direction, and right and left when facing the traveling direction.

Figure 1:
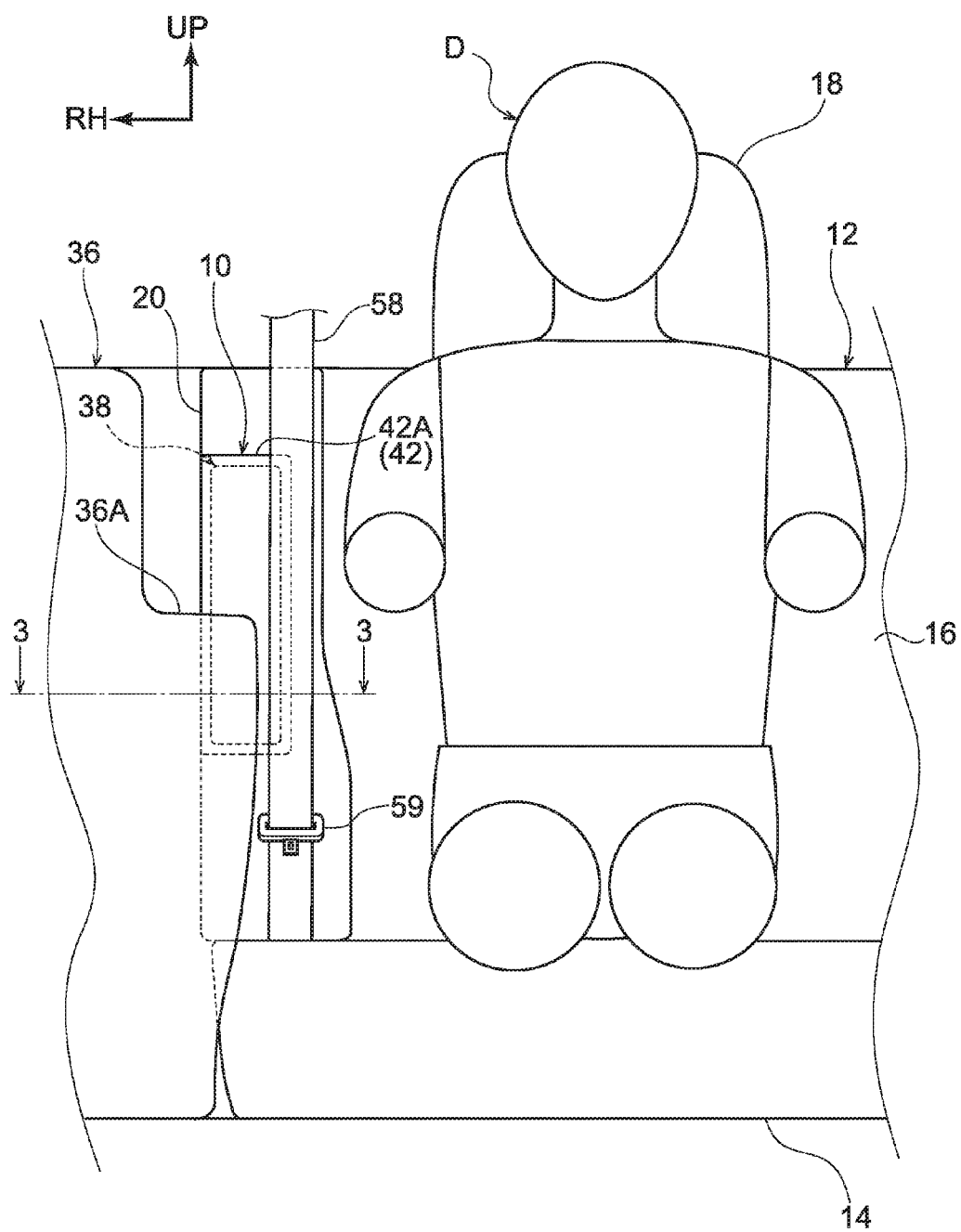
FIG. 1 is a front view showing a rear seat to which a rear seat side airbag device pertaining to the embodiment has been applied.

FIG. 1 is a front view showing, as seen from the vehicle front side, a rear seat 12 to which the rear seat side airbag device 10 pertaining to the present embodiment has been applied. Furthermore, FIG. 1 shows a state in which a collision test dummy, serving as a model of an occupant to be protected, is sitting on a seat cushion 14 of the rear seat 12. The dummy is, for example, World Side Impact Dummy (WorldSID) AM50 (representing a 50th percentile American adult male). The dummy is sitting in a standard sitting posture determined by collision test procedures, and the rear seat 12 is positioned in a standard set position corresponding to the sitting posture. Below, in order to facilitate understanding of the description, the dummy is called an "occupant D".

As shown in FIG. 1, the rear seat 12 is configured to include the seat cushion 14 and a seat back 16. A head rest 18 for supporting the head of the occupant D is disposed on the upper end portion of the seat back 16. Furthermore, webbing (a belt) 58 for restraining the occupant D is disposed on the side of the occupant D. The webbing 58 extends in the vehicle upward and downward direction, and one end portion of the webbing 58 is secured to a belt anchor (not shown in the drawings) attached to a vehicle floor. The other end portion of the webbing 58 is taken up on a retractor (not shown in the drawings) installed on an upper back panel. Moreover, the webbing 58 is inserted through a tongue plate 59 that becomes fastened to a buckle (not shown in the drawings).

Here, a side garnish 20 is disposed on both vehicle width direction sides of the seat back 16 of the rear seat 12, and the rear seat side airbag device 10 is attached to the side garnish 20. It should be noted that, although FIG. 1 shows only the side garnish 20 and the rear seat side airbag device 10 on the vehicle right side of the seat back 16, the side garnish 20 and the rear seat side airbag device 10 are also likewise disposed on the vehicle left side of the seat back 16. Furthermore, the rear seat side airbag device 10 on the vehicle right side and the rear seat side airbag device 10 on the vehicle left side are bilaterally symmetrical, so in the following description only the rear seat side airbag device 10 on the vehicle right side is described.

Figure 3:
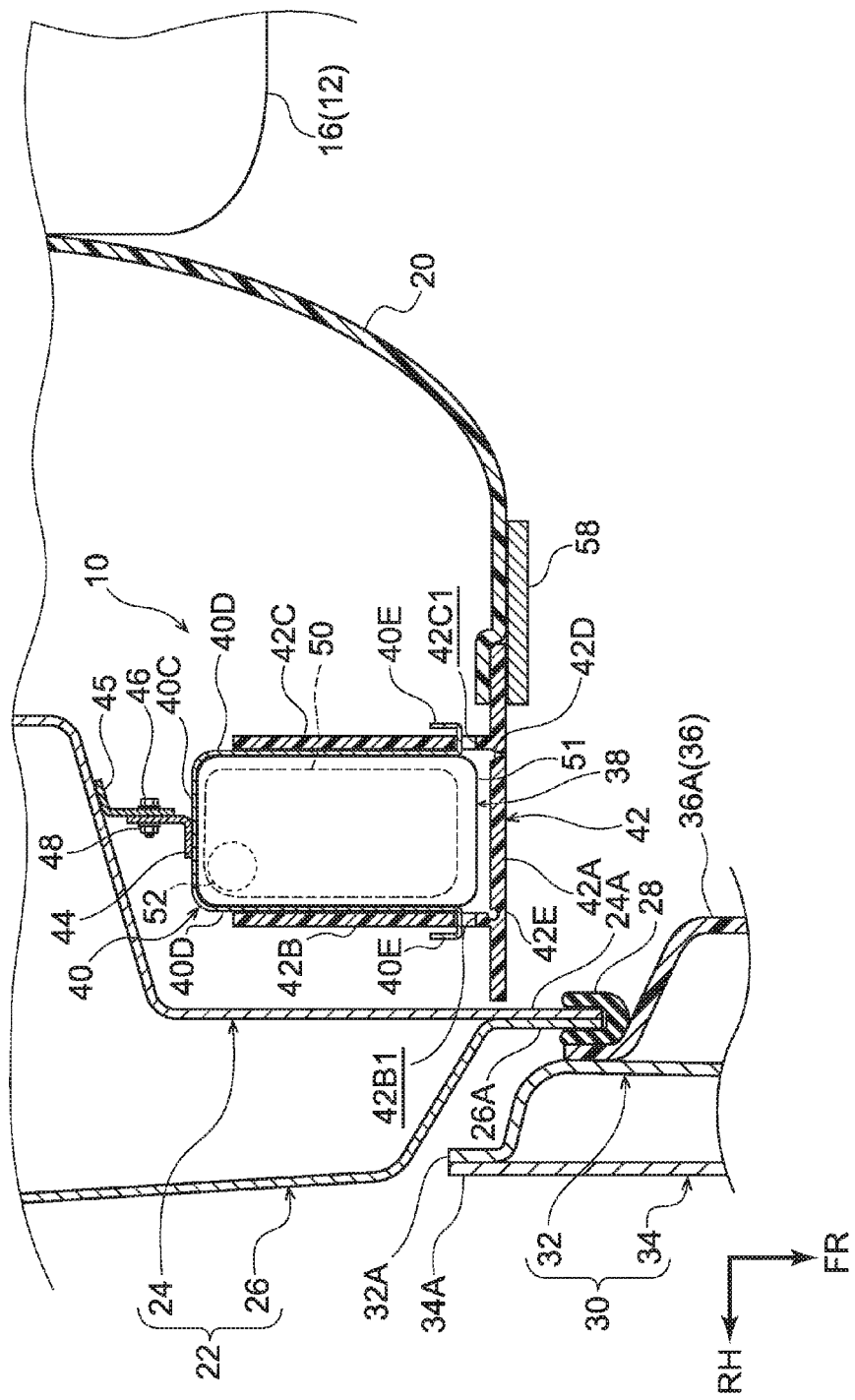
FIG. 3 is an enlarged cross-sectional view cut along line 3-3 of FIG. 1.

As shown in FIG. 3, the side garnish 20 is disposed between the seat back 16 and a wheel well 22, which is an example of a body according to the technology of the present disclosure, and the side garnish 20 is made of resin. Furthermore, the rear seat side airbag device 10 is attached to the vehicle right side (vehicle width direction outside) end portion of the side garnish 20. The rear seat side airbag device 10 will be described later.

The wheel well 22 is configured to include a wheel well inner panel 24 that configures an inner panel and a wheel well outer panel 26 that configures an outer panel. Furthermore, the wheel well inner panel 24 extends in the vehicle forward and rearward direction along the side portion on the vehicle right side of the rear seat side airbag device 10 and bulges out in the vehicle leftward direction (inward in the vehicle width direction) on the vehicle rear side of the rear seat side airbag device 10. Furthermore, an inner-side flange 24A is formed on the front end portion of the wheel well inner panel 24.

The wheel well outer panel 26 extends in the vehicle forward and rearward direction on the vehicle right side of the wheel well inner panel 24 and configures a closed cross section between itself and the wheel well inner panel 24. Furthermore, an outer-side flange 26A is formed along the inner-side flange 24A on the front end portion of the wheel well outer panel 26. Additionally, the inner-side flange 24A and the outer-side flange 26A are joined to each other to configure a rear edge of a door opening. Furthermore, a weather strip 28 is attached to the joint section of the inner-side flange 24A and the outer-side flange 26A.

A rear side door 30 is placed on the vehicle front side of the wheel well 22. The rear side door 30 is configured to include a door inner panel 32 that configures an inner panel and a door outer panel 34 that configures an outer panel. Additionally, an inner-side flange 32A formed on the peripheral edge of the door inner panel 32 and an outer-side flange 34A formed on the peripheral edge of the door outer panel 34 are joined to each other. Furthermore, a door trim 36 made of resin that is an interior part is attached to the vehicle left side of the door inner panel 32. As shown in FIG. 1, an arm rest 36A that juts out in the vehicle leftward direction is disposed on the door trim 36.

As shown in FIG. 3, the rear seat side airbag device 10 attached to the side garnish 20 is configured to include an airbag module 38, a case 40, and an airbag door garnish 42 (hereinafter appropriately called "the airbag door 42").

The airbag module 38 is placed between the side portion of the seat back 16 and the wheel well 22, and is configured to include a side airbag 50 and an inflator 52. Furthermore, as shown in FIG. 1, the airbag module 38 is placed in a position where at least part of the airbag module 38 overlaps with the arm rest 36A as seen in a vehicle front view.

As shown in FIG. 3, the side airbag 50 is formed in a bag-shape and deploys at the side of the occupant D at the time of a collision to protect the occupant D. Furthermore, the side airbag 50 of the present embodiment is wrapped in a folded state in a wrap 51 that easily ruptures. It should be noted that the way in which side airbag 50 is folded is not particularly limited, and the side airbag 50 may be folded in a serpentine shape or in a roll shape. Furthermore, the side airbag 50 may also be housed without being folded.

Figure 4:
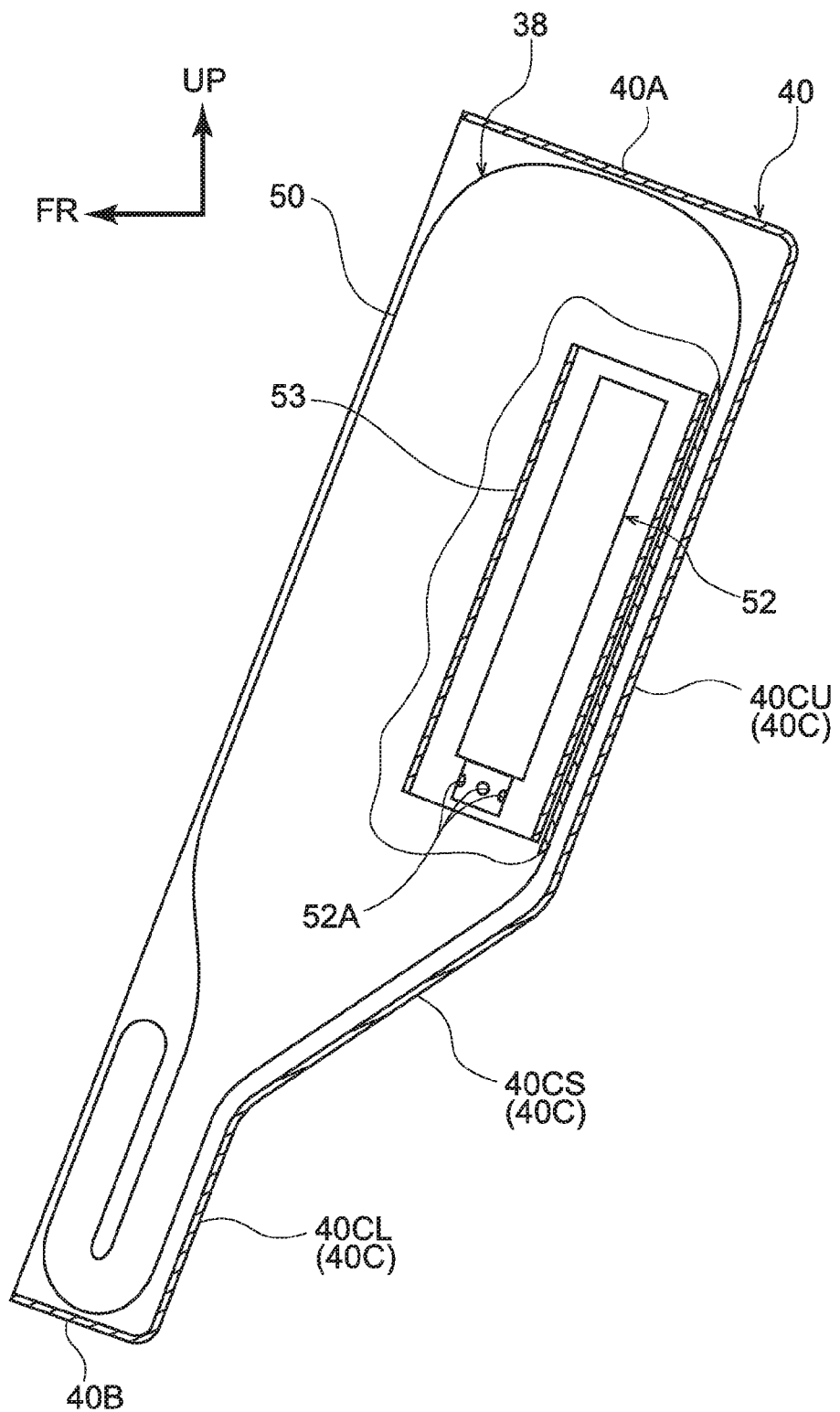
FIG. 4 is an enlarged side view showing an airbag module pertaining to the embodiment and shows a state before deployment of a side airbag.

The inflator 52 is, together with the side airbag 50, wrapped in the wrap 51. A combustible or cold gas inflator is employed as the inflator 52. The inflator 52 supplies gas generated upon actuation to the side airbag 50. In the present embodiment, the inflator 52 comprises a cylinder inflator and is placed in such a way that its lengthwise direction lies along the vehicle upward and downward direction. Furthermore, as shown in FIG. 4, plural gas discharge openings 52A are formed in, and along the peripheral surface of, the lower end portion of the inflator 52, and the gas is discharged from the gas discharge openings 52A upon actuation of the inflator 52.

Moreover, a diffuser 53 that is a flow regulation cloth is placed around the inflator 52. The diffuser 53 is formed in a substantially tubular shape open at both end portions, and is configured to make the gas generated from the inflator 52 flow in the vehicle upward direction and the vehicle downward direction. Furthermore, the inflator 52 is electrically connected to an electronic control unit (ECU) (not shown in the drawings), and the inflator 52 is actuated by the ECU at the time of a vehicle collision.

The case 40 housing the airbag module 38 is formed in the shape of a box whose vehicle front side is open. An upper wall 40A and a lower wall 40B are disposed on the upper end portion and the lower end portion, respectively, of the case 40. The upper wall 40A is placed on the vehicle upper side of the airbag module 38 and configures an upper surface of the case 40. The lower wall 40B is placed on the vehicle lower side of the airbag module 38 and configures a lower surface of the case 40.

A bottom wall 40C that interconnects the rear ends of the upper wall 40A and the lower wall 40B is disposed in the case 40 on the vehicle rear side of the airbag module 38. The bottom wall 40C is configured to support, from the vehicle rear side, the side airbag 50 in a deployed state. Furthermore, as shown in FIG. 3, a pair of side walls 40D extend in the vehicle forward direction from both vehicle width direction end portions of the bottom wall 40C. The pair of side walls 40D are spaced apart from and oppose each other in the vehicle width direction. Furthermore, anchoring claws 40E are formed on the side walls 40D. One of the anchoring claws 40E extends outward from the front end edge of the side walls 40D and the other of the anchoring claws 40E extends outward from the front end edges of the side walls 40D. And each of the anchoring claws 40E is bent in the vehicle rearward direction. For this reason, the anchoring claws 40E are each formed in a substantially L-shape (a substantially J-shape) as seen in a vehicle plan view. Additionally, the anchoring claws 40E are anchored to the airbag door 42.

Furthermore, an L-shaped bracket 44 is joined to the vehicle rear side surface of the bottom wall 40C of the case 40. An L-shaped bracket 45 is also joined to the wheel well inner panel 24, and the L-shaped bracket 44 on the case 40 and the L-shaped bracket 45 on the wheel well inner panel 24 are fastened to each other via a bolt 46 and a nut 48. Because of this, the case 40 is secured to the wheel well 22.

Here, as shown in FIG. 4, a sloping surface 40CS is formed in the lower portion of the bottom wall 40C. The sloping surface 40CS is formed on the vehicle lower side of the inflator 52 and in a position offset on the vehicle upper side of the lower end of the case 40. Furthermore, the sloping surface 40CS slopes in the vehicle forward direction heading in the vehicle downward direction relative to a common portion 40CU of the bottom wall 40C. Additionally, a region 40CL of the bottom wall 40C on the vehicle lower side of the sloping surface 40CS is positioned more in the vehicle forward direction compared to the common portion 40CU on the vehicle upper side of the sloping surface 40CS of the bottom wall 40C. Furthermore, the side airbag 50 stored in the case 40 is folded in the forward and rearward direction and is turned back in the vehicle forward direction in the region 40CL on the vehicle lower side of the sloping surface 40CS of the bottom wall 40C.

Figure 2:
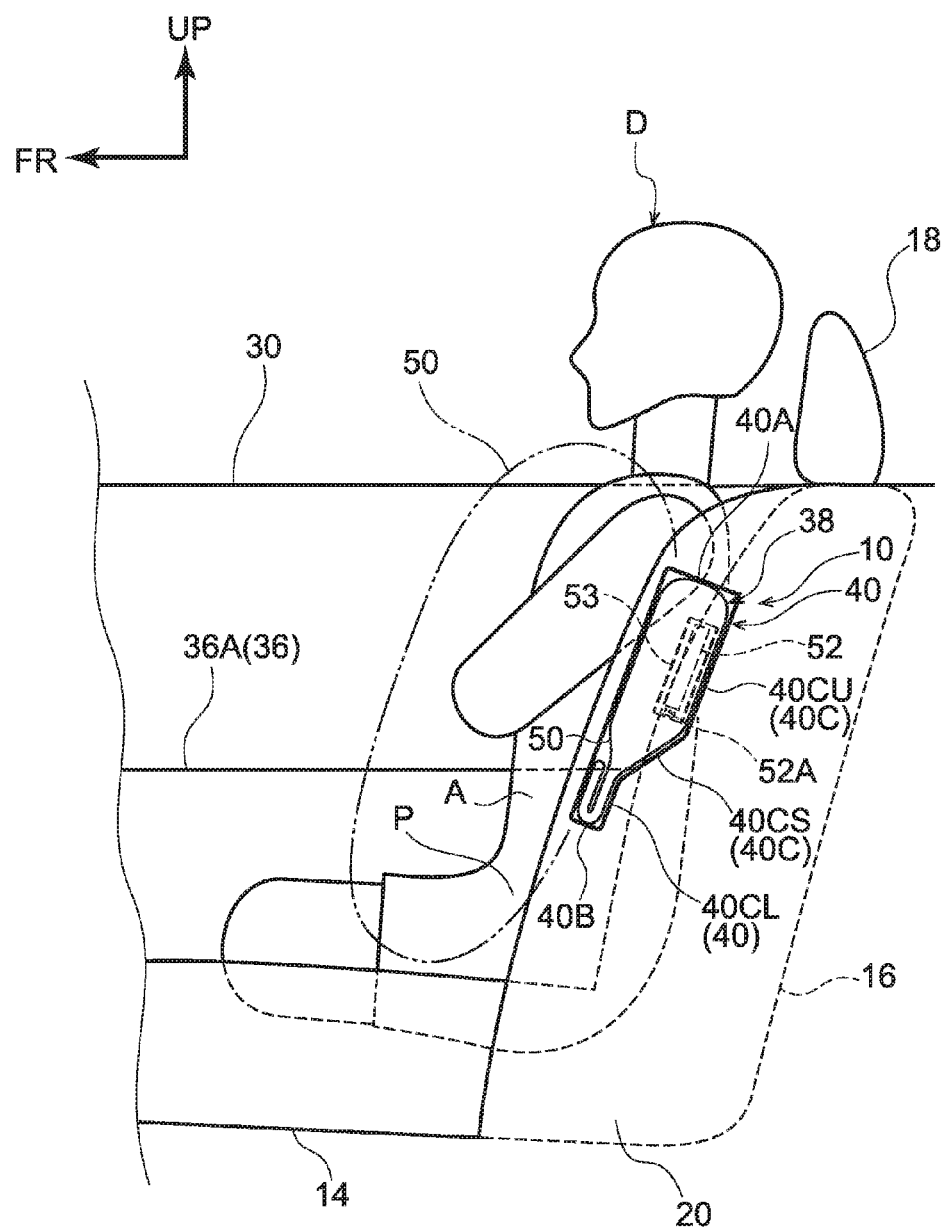
FIG. 2 is a side view of FIG. 1 showing, as seen from outside in the seat width direction, the rear seat to which the rear seat side airbag device pertaining to the embodiment has been applied.

As shown in FIG. 2, the sloping surface 40CS is formed in a position where it overlaps with the upper surface of the arm rest 36A of the rear side door 30 as seen in a vehicle side view or on the vehicle lower side of the upper surface of the arm rest 36A. That is, the lower end portion of the sloping surface 40CS is positioned on the vehicle lower side of the upper surface of the arm rest 36A as seen in a vehicle side view.

As shown in FIG. 3, the airbag door 42 is placed on the vehicle front side of the case 40, and the airbag module 38 is covered from the cabin side by the airbag door 42.

As seen in a vehicle plan sectional view the airbag door 42 is configured to include a horizontal wall portion 42A, which extends in the vehicle width direction, and a vertical wall portion 42B and a vertical wall portion 42C, which extend in the vehicle rearward direction from the horizontal wall portion 42A. Furthermore, the horizontal wall portion 42A extends in the vehicle width direction between the side garnish 20 and the wheel well inner panel 24. Moreover, the horizontal wall portion 42A is formed in a substantially rectangular shape whose lengthwise direction lies along the vehicle upward and downward direction as seen in a vehicle front view (see FIG. 1).

The vertical wall portion 42B and the vertical wall portion 42C are placed opposing each other in the vehicle width direction. The vertical wall portion 42B extends in the vehicle rearward direction from the vehicle right side of the vehicle width direction central section of the horizontal wall portion 42A. The vertical wall portion 42C extends in the vehicle rearward direction from the vehicle left side of the vehicle width direction central section of the horizontal wall portion 42A.

Here, an anchoring hole 42B1 is formed in the vertical wall portion 42B, and the anchoring claw 40E formed on the side wall 40D on the vehicle right side of the case 40 is anchored in the anchoring hole 42B1. Furthermore, an anchoring hole 42C1 is formed in the vertical wall portion 42C, and the anchoring claw 40E formed on the side wall 40D on the vehicle left side of the case 40 is anchored in the anchoring hole 42C1.

Furthermore, a thin-walled tear portion 42D is formed in the horizontal wall portion 42A at the base section of the vertical wall portion 42C. The tear portion 42D is a prescribed rupture portion that becomes ruptured by the inflation pressure of the side airbag 50 described later. Moreover, a thin-walled hinge portion 42E is formed in the horizontal wall portion 42A at the base section of the vertical wall portion 42B. The hinge portion 42E is formed thicker than the tear portion 42D. Additionally, as a result of the tear portion 42D being ruptured when the side airbag 50 is inflated and deployed, the hinge portion 42E serves as a hinge so that the section of the horizontal wall portion 42A between the tear portion 42D and the hinge portion 42E opens in the vehicle forward direction around the hinge portion 42E.

Figure 5:
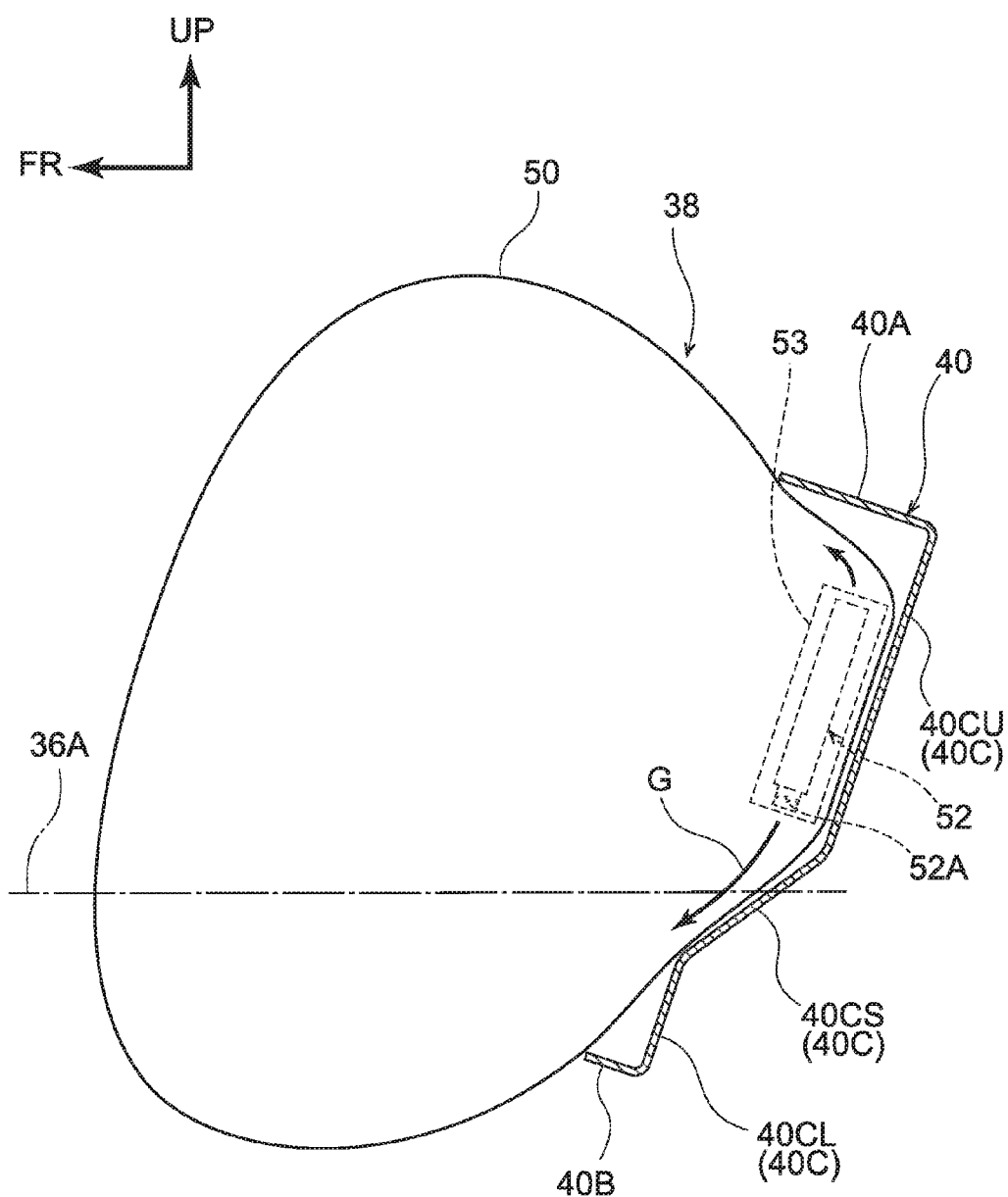
FIG. 5 is a view corresponding to FIG. 4 and shows a state after deployment of the side airbag.

As shown in FIG. 5, in a state in which the side airbag 50 is deployed, the lower portion of the side airbag 50 that had been stored in the region 40CL on the vehicle lower side of the sloping surface 40CS of the bottom wall 40C of the case 40 is deployed below the upper surface of the arm rest 36A. Additionally, a pelvic region P and an abdominal region A of the occupant D are protected by the lower portion of the side airbag 50. It should be noted that the long dashed short dashed line in FIG. 5 indicates the height of the upper surface of the arm rest 36A. The same is also true in FIG. 6 to FIG. 10.

(Action and Effects)

Next, the action and effects of the rear seat side airbag device 10 pertaining to the present embodiment will be described.

In the present embodiment, the bottom wall 40C of the case 40 supports, from the vehicle rear side, the side airbag 50 in a deployed state. Because of this, when the gas is supplied from the inflator 52 to the side airbag 50 at the time of a collision, the side airbag 50 bears a reaction force from the bottom wall 40C and becomes deployed in the vehicle forward direction.

Here, the sloping surface 40CS is formed in the lower portion of the bottom wall 40C, so the gas generated from the inflator 52 and flowing in the vehicle downward direction flows along the sloping surface 40CS to the lower portion of the side airbag 50 (see arrow G in FIG. 5). As a result, the lower portion of the side airbag 50 can be rapidly deployed on the side of the occupant D (between the pelvic region P and the abdominal region A of the occupant D and the arm rest 36A).

Furthermore, in the present embodiment, the region 40CL on the vehicle lower side of the sloping surface 40CS of the bottom wall 40C is positioned more in the vehicle forward direction than the common portion 40CU on the vehicle upper side of the sloping surface 40CS of the bottom wall 40C. For this reason, when the side airbag 50 becomes deployed, the lower portion of the side airbag 50 bears the reaction force more on the vehicle front side than the upper portion of the side airbag 50. Because of this, compared to a configuration where the common portion 40CU on the vehicle upper side of the sloping surface 40CS of the bottom wall 40C and the region 40CL on the vehicle lower side of the sloping surface 40CS of the bottom wall 40C are formed in the same position in the vehicle forward and rearward direction, the lower portion of the side airbag 50 can be rapidly deployed. That is, the lower portion of the side airbag 50 can be rapidly deployed utilizing the difference in the positions of the reaction force surfaces that cause the reaction force to act on the lower portion and the upper portion of the side airbag 50.

Moreover, in the present embodiment, the lower portion of the side airbag 50 is turned back in the vehicle forward direction on the vehicle lower side of the sloping surface 40CS of the bottom wall 40C. Because of this, when the gas is supplied from the inflator 52, the turned-back region of the side airbag 50 opens in the vehicle forward direction because of the deployment pressure, so that the lower portion of the side airbag 50 can be rapidly deployed. As a result, compared to a configuration where the lower portion of the side airbag 50 is not turned back or a configuration where the lower portion of the side airbag 50 is turned back in the vehicle rearward direction, the lower portion of the side airbag 50 can be more rapidly deployed.

Furthermore, as shown in FIG. 1, in the present embodiment, the airbag module 38 is placed in a position where at least part of the airbag module 38 overlaps with the arm rest 36A as seen in a vehicle front view, but even in this case, the ability of the side airbag 50 to protect the occupant D can be well maintained. That is, in a case where the door trim 36 has entered the cabin at the time of a collision such as a side collision, there is the potential for the arm rest 36A to contact the pelvic region P or the abdominal region A of the occupant D. Here, the more the door trim 36 enters the cabin, the more the deployment of the side airbag 50 in the vehicle forward direction becomes obstructed so that the side airbag 50 becomes unable to be deployed on the side of the occupant D. For this reason, it is necessary to rapidly deploy the lower portion of the side airbag 50. Particularly, in a case where the airbag module 38 is placed in a position where at least part of the airbag module 38 overlaps with the arm rest 36A as seen in a vehicle front view, it is easy for the deployment of the side airbag 50 to be obstructed, so it becomes important to rapidly deploy the lower portion of the side airbag 50. In the present embodiment, the sloping surface 40CS is formed in a position where it overlaps with the upper surface of the arm rest 36A as seen in a vehicle side view or on the vehicle lower side of the upper surface of the arm rest 36A. Because of this, the lower portion of the side airbag 50 can be rapidly deployed, and even in a case where the space between the door trim 36 and the pelvic region P and the abdominal region A of the occupant D is narrow, the side airbag 50 can be deployed in this space. As a result, the occupant D can be protected by the side airbag 50 before the arm rest 36A contacts the occupant D.

It should be noted that the position and the shape of the case 40 are not particularly limited and, for example, may also be given configurations described in first to fifth example modifications below.

First Example Modification

Figure 6:
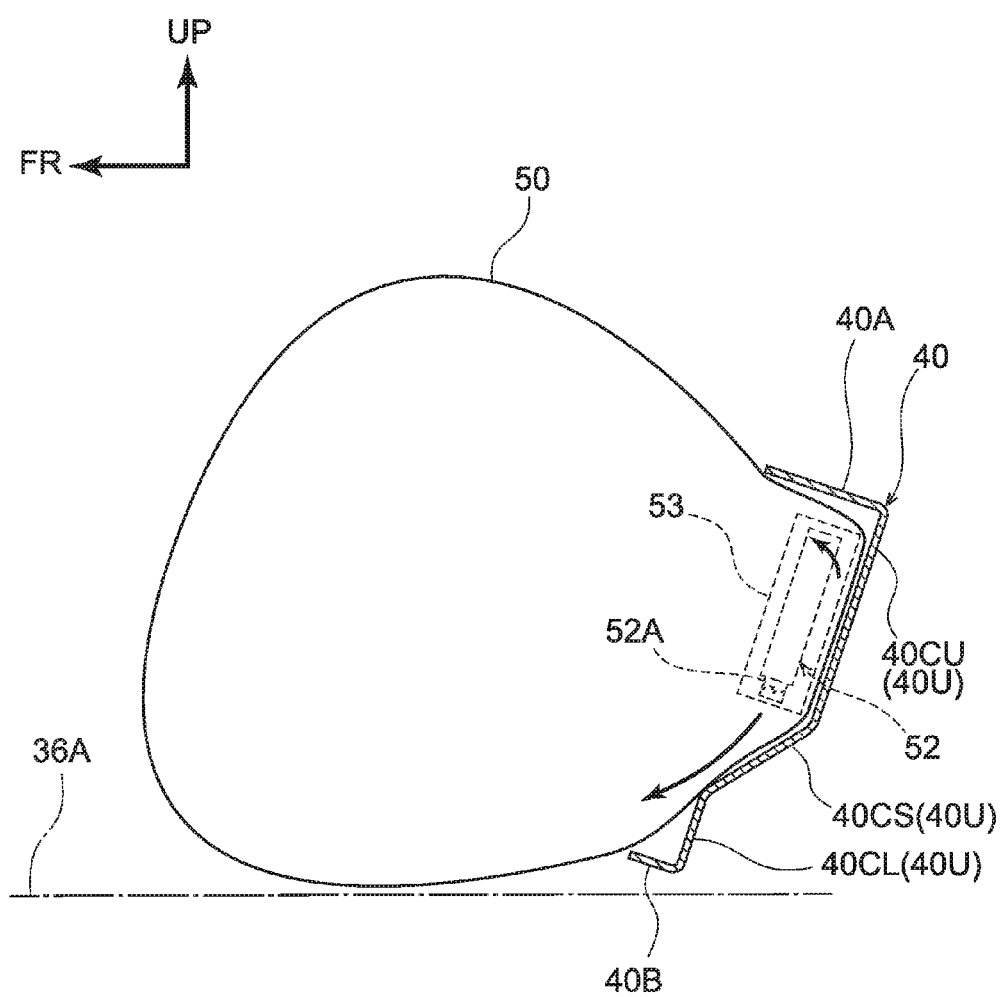
FIG. 6 is a side view corresponding to FIG. 5 and shows a first example modification of the rear seat side airbag device pertaining to the embodiment.

As shown in FIG. 6, in this example modification, the whole of the case 40 is positioned on the vehicle upper side of the upper surface of the arm rest 36A. Additionally, the entire side airbag 50 in a deployed state is positioned on the vehicle upper side of the upper surface of the arm rest 36A. For this reason, obstruction of the deployment of the side airbag 50 by the arm rest 36A can be avoided or reduced.

Furthermore, the sloping surface 40CS is formed in the bottom wall 40C of the case 40, so the lower portion of the side airbag 50 that is close to the pelvic region P and the abdominal region A of the occupant D can be rapidly deployed. It should be noted that, in this example modification, an airbag that protects the pelvic region P and the abdominal region A of the occupant D may also be disposed separately from the side airbag 50. For example, an airbag that protects the pelvic region P and the abdominal region A of the occupant D by causing side support portions in both vehicle width direction end portions of the seat cushion to bulge out may also be disposed. In this case, the range of protection of the occupant D can be enlarged as compared to a configuration equipped with only the side airbag 50, and protection performance can be improved.

Second Example Modification

Figure 7:
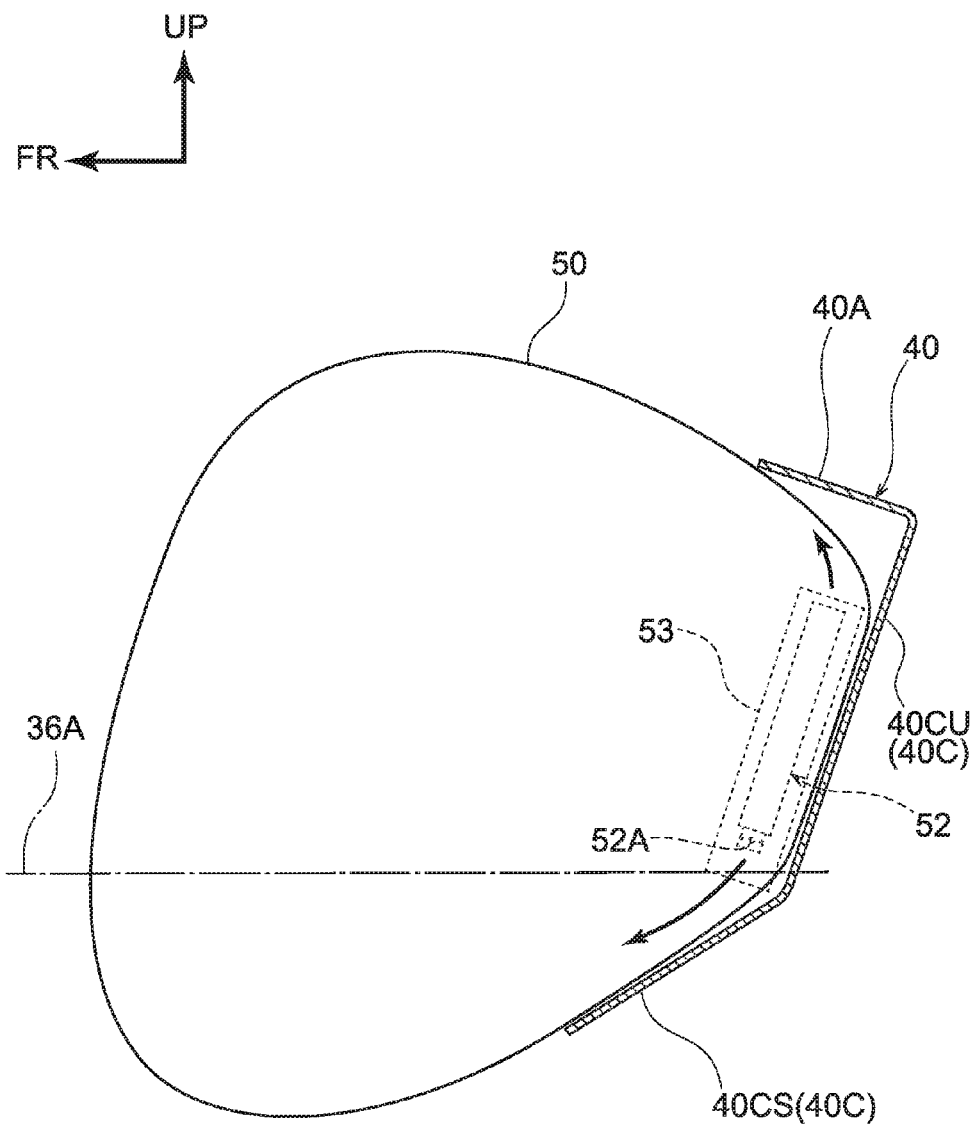
FIG. 7 is a side view corresponding to FIG. 5 and shows a second example modification of the rear seat side airbag device pertaining to the embodiment.

Next, a second example modification will be described. As shown in FIG. 7, in the case 40 of this example modification, the sloping surface 40CS of the bottom wall 40C is positioned on the vehicle lower side of the upper surface of the arm rest 36A. Furthermore, the sloping surface 40CS is formed longer than it is in the above-described embodiment shown in FIG. 5; in this example modification, the sloping surface 40CS is formed as far as the lower end of the bottom wall 40C. For this reason, in this example modification, the case 40 lacks the region 40CL on the vehicle lower side of the sloping surface 40CS and also lacks the lower wall 40B.

In this example modification, the gas generated from the inflator 52 can be made to flow along the sloping surface 40CS to the lower end of the case 40. Furthermore, compared to a configuration where the lower wall 40B is formed in the case 40 like in FIG. 5, the flow of the gas is not obstructed by the lower surface of the case 40. Because of this, compared to a configuration where the sloping surface 40CS is formed on the vehicle upper side of the lower end of the case 40, the lower portion of the side airbag 50 can be rapidly deployed.

Third Example Modification

Figure 8:
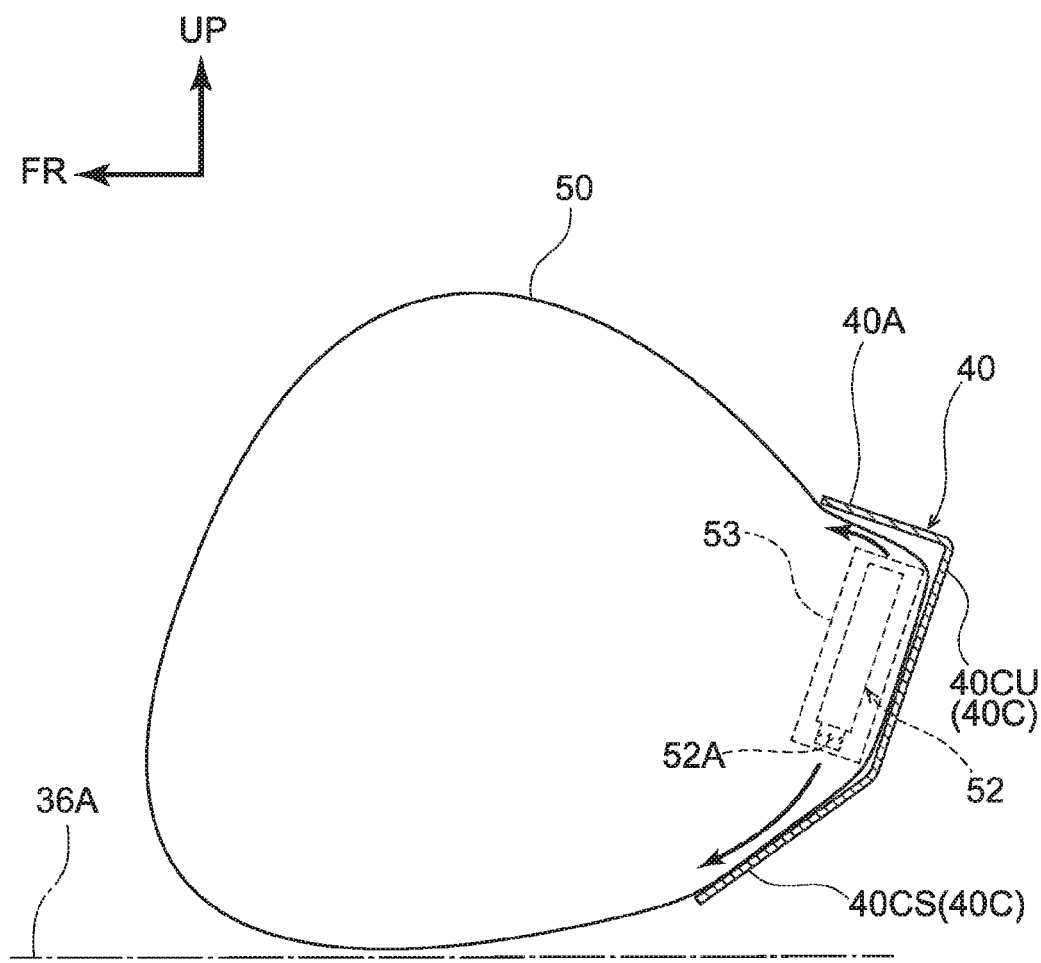
FIG. 8 is a side view corresponding to FIG. 5 and shows a third example modification of the rear seat side airbag device pertaining to the embodiment.

Next, a third example modification will be described. As shown in FIG. 8, the case 40 of this example modification has the same shape as the case 40 of the second example modification. That is, the sloping surface 40CS is formed as far as the lower end of the bottom wall 40C. Furthermore, in this example modification, the entire case 40 is positioned on the vehicle upper side of the upper surface of the arm rest 36A. Additionally, the whole of the side airbag 50 in a deployed state is positioned on the vehicle upper side of the upper surface of the arm rest 36A. Fort this reason, obstruction of the deployment of the side airbag 50 by the arm rest 36A can be avoided or reduced.

It should be noted that an airbag that protects the pelvic region P and the abdominal region A of the occupant D may also be disposed separately from the side airbag 50. For example, an airbag that protects the pelvic region P and the abdominal region A of the occupant D by causing side support portions in both vehicle width direction end portions of the seat cushion to bulge out may also be disposed. In this case, the range of protection of the occupant D can be enlarged compared to a configuration equipped with only the side airbag 50, and protection performance can be improved.

Fourth Example Modification

Figure 9:
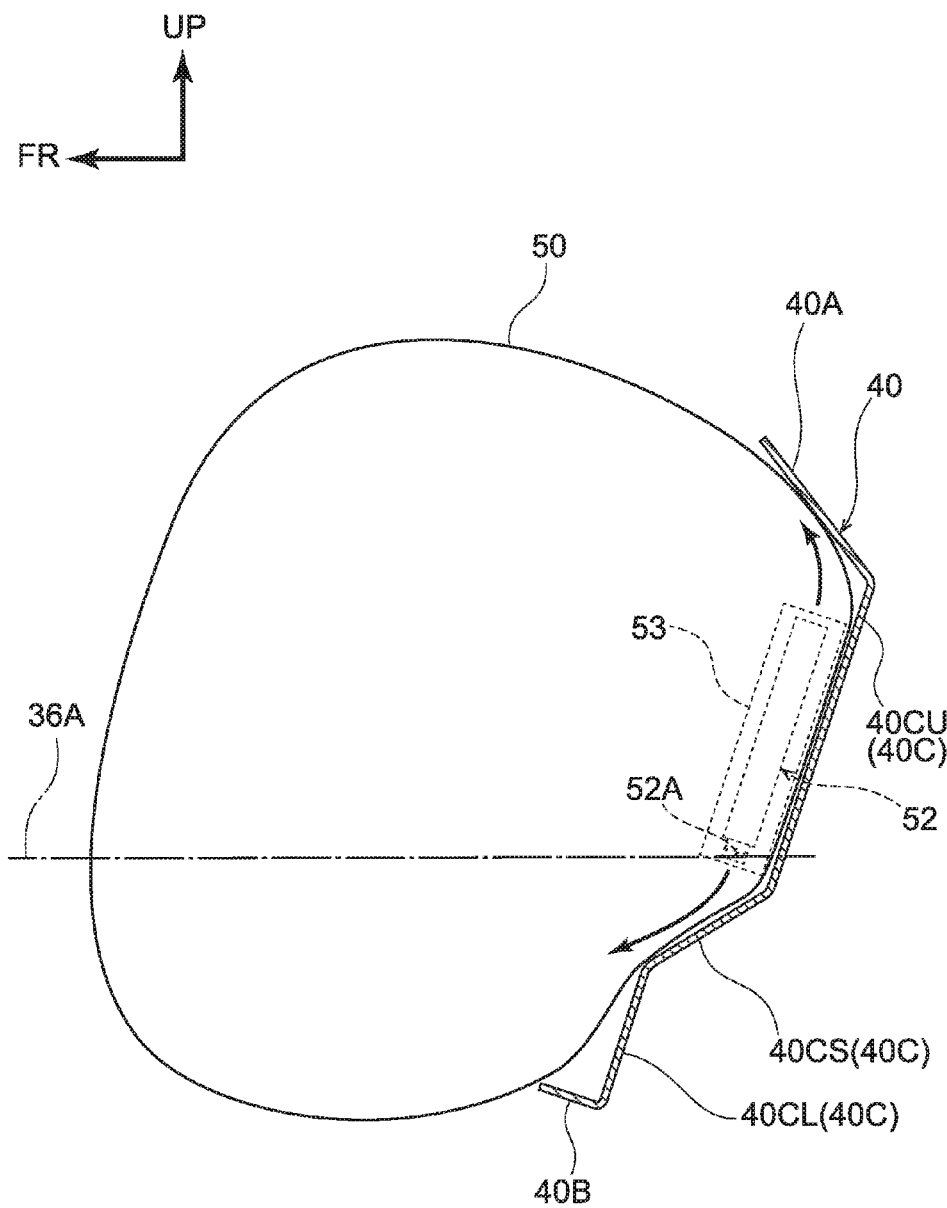
FIG. 9 is a side view corresponding to FIG. 5 and shows a fourth example modification of the rear seat side airbag device pertaining to the embodiment.

Next, a fourth example modification will be described. As shown in FIG. 9, in this example modification, the upper wall 40A of the case 40 is different from the above-described embodiment. Specifically, the upper wall 40A of this example modification extends in the vehicle forward direction from the bottom wall 40C as seen in a vehicle side view and forms an obtuse angle with the bottom wall 40C. Other configurations are the same as those in the above-described embodiment.

In this example modification, the upper wall 40A slopes more in the vehicle upward direction, compared to the above-described embodiment and first to third example modifications, so the gas generated from the inflator 52 and heading in the vehicle upward direction can be made to flow along the upper wall 40A to the upper portion of the side airbag 50. Because of this, compared to the above-described embodiment, the upper portion of the side airbag 50 can be deployed more rapidly.

The sloping surface 40CS is formed in the lower portion of the bottom wall 40C, so the gas generated from the inflator 52 and heading in the vehicle downward direction can be made to flow along the sloping surface 40CS to the lower portion of the side airbag 50. In this way, in this example modification, the upper portion and the lower portion of the side airbag 50 can be rapidly deployed. It should be noted that, although in this example modification the case 40 is placed in a position where the sloping surface 40CS of the bottom wall 40C overlaps with the upper surface of the arm rest 36A as seen in a vehicle side view, the position of the case 40 is not limited to this. The whole of the case 40 may also be placed on the vehicle upper side of the upper surface of the arm rest 36A.

Fifth Example Modification

Figure 10:
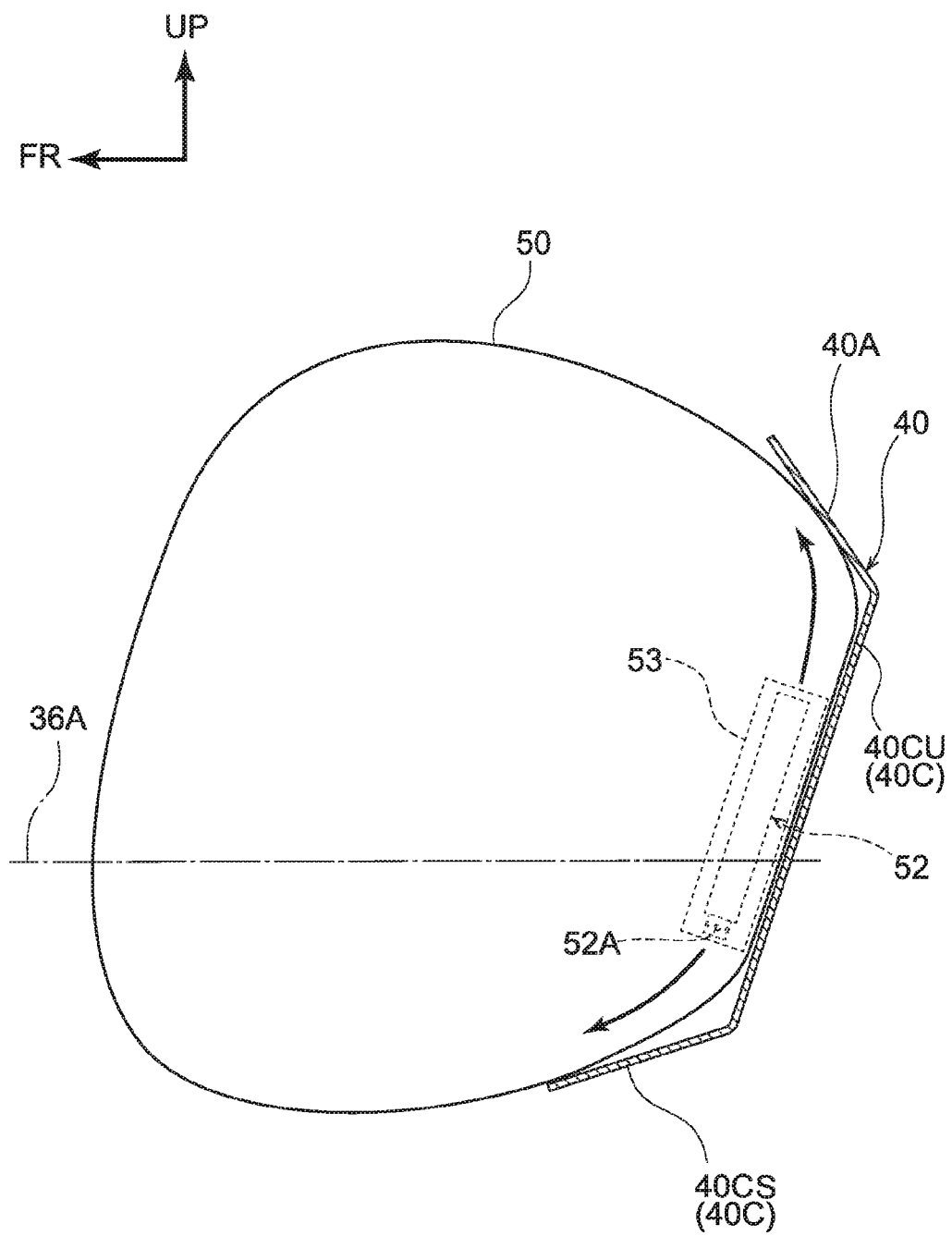
FIG. 10 is a side view corresponding to FIG. 5 and shows a fifth example modification of the rear seat side airbag device pertaining to the embodiment.

Next, a fifth example modification will be described. As shown in FIG. 10, the case 40 of this example modification is configured in such a way that an obtuse angle is formed by the upper wall 40A and the bottom wall 40C like in the fourth example modification. Furthermore, like in the second example modification, the sloping surface 40CS is formed as far as the lower end of the bottom wall 40C and the lower wall 40B is not disposed.

In this example modification, the gas generated from the inflator 52 and heading in the vehicle upward direction can be made to flow along the upper wall 40A to the upper portion of the side airbag 50. Furthermore, the flow of the gas heading toward the upper portion of the side airbag 50 is not obstructed by the upper wall 40A. The gas generated from the inflator 52 and heading in the vehicle downward direction can be made to flow along the sloping surface 40CS to the lower end of the case 40. Furthermore, compared to a configuration where the lower wall 40B is formed in the case 40, the flow of the gas is not obstructed by the lower wall 40B. Because of this, the upper portion and the lower portion of the side airbag 50 can be rapidly deployed.

An embodiment and example modifications of the technology of the present disclosure have been described above, but the technology of the present disclosure can of course be implemented in a variety of ways without departing from the spirit of the technology of the present disclosure. For example, in the above-described embodiment and example modifications, as shown in FIG. 2, the case 40 is placed sloping relative to the vehicle upward and downward direction so that the lower end of the case 40 is positioned more in the vehicle forward direction than the upper end of the case 40, but the technology of the present disclosure is not limited to this. The case 40 may also be placed in an upright state from the state shown in FIG. 2 so that the common portion excluding the sloping surface 40CS of the bottom wall 40C of the case 40 coincides with the vehicle upward and downward direction as seen in a vehicle side view.

Furthermore, in the above-described embodiment and example modifications, the inflator 52 is placed in such a way that the gas discharge openings 52A in the inflator 52 face downward, but the technology of the present disclosure is not limited to this. For example, the disclosure may also be given a structure where the inflator 52 is placed in such a way that the gas discharge openings 52A face upward. However, from the standpoint of rapidly deploying the lower portion of the side airbag 50, inflator 52 is preferably placed in such a way that the gas discharge openings 52A face downward. Furthermore, an inflator 52 having gas discharge openings 52A formed in both its upper end and its lower end may also be used.

Moreover, in the above-described embodiment and example modifications, as shown in FIG. 1, the airbag module 38 is placed in such a way that part of the airbag module 38 overlaps with the arm rest 36A as seen in a vehicle front view, but the technology of the present disclosure is not limited to this. The airbag module 38 may also be placed on the vehicle width direction inside of the arm rest 36A as seen in a vehicle front view. In this case, compared to a configuration where the airbag module 38 is placed in such a way that part of the airbag module 38 overlaps with the arm rest 36A as seen in a vehicle front view, it can be made easier to deploy the side airbag 50 between the occupant D and the arm rest 36A.

What is claimed is:

1. A rear seat side airbag device comprising:
    an airbag module that is placed between a side portion of a seat back of a rear seat and a body, the airbag comprising a side airbag that deploys at the side of an occupant at a time of a collision and an inflator that supplies a gas to the side airbag; and
    a case in which the airbag module is stored, the case being equipped with a bottom wall that supports, from a vehicle rear side, the side airbag in a deployed state,
    wherein the case has a sloping surface that is formed at a lower portion of the bottom wall and that slopes in a vehicle forward direction heading in a vehicle downward direction relative to a common portion of the bottom wall.

2. The rear seat side airbag device according to claim 1, wherein the sloping surface is formed as far as a lower end of the bottom wall.

3. The rear seat side airbag device according to claim 1, wherein
    the sloping surface is formed at a position that is offset to a vehicle upper side of a lower end of the bottom wall, and
    a region of the bottom wall on a vehicle lower side of the sloping surface is positioned further in the vehicle forward direction than the common portion on the vehicle upper side of the sloping surface.

4. The rear seat side airbag device according to claim 3, wherein the side airbag is turned back in the vehicle forward direction inside the case on the vehicle lower side of the sloping surface.

5. The rear seat side airbag device according to claim 1, wherein a lower end portion of the sloping surface is positioned at a vehicle lower side of an upper surface of an arm rest of a rear side door as seen in a vehicle side view.

6. The rear seat side airbag device according to claim 5, wherein the airbag module is placed in a position where at least part of the airbag module overlaps with the arm rest as seen in a vehicle front view.

7. The rear seat side airbag device according to claim 1, wherein an upper wall, which extends in the vehicle forward direction from the bottom wall as seen in a vehicle side view and forms an obtuse angle with the bottom wall, is disposed on an upper end portion of the case.

* * * * *